United States Patent [19]
Hofer et al.

[11] 3,906,041
[45] Sept. 16, 1975

[54] OXALIC ACID DERIVATIVES

[75] Inventors: Kurt Hofer, Munchenstein; Rudolf Moesch, Stein; Alfred Schilli, Reinach, all of Switzerland; Evelyne Burdet, Mulhouse, France

[73] Assignee: Sandoz Ltd., Basel, Switzerland

[22] Filed: Sept. 7, 1973

[21] Appl. No.: 405,331

Related U.S. Application Data

[63] Continuation-in-part of Ser. Nos. 170,660, Aug. 10, 1971, Pat. No. 3,808,273, and Ser. No. 808,041, March 12, 1969, abandoned, said Ser. No. 808,041, is a continuation-in-part of Ser. No. 799,898, Feb. 17, 1969, abandoned.

[30] Foreign Application Priority Data

Feb. 19, 1968 Switzerland.......................... 2371/68
Mar. 12, 1968 Switzerland.......................... 3641/68
Aug. 13, 1970 Switzerland........................ 12173/71

[52] U.S. Cl....... 260/558 S; 260/559 T; 260/559 A; 260/45.9 NC; 252/391; 252/392
[51] Int. Cl.²......................................... C07C 103/30
[58] Field of Search............................. 260/558, 559

[56] References Cited
UNITED STATES PATENTS 3,529,982  9/1970  Luethi et al. ...................... 260/559

FOREIGN PATENTS OR APPLICATIONS 1,516,276  1/1968  France................................ 260/559

*Primary Examiner*—Harry I. Moatz
*Attorney, Agent, or Firm*—Gerald D. Sharkin; Richard E. Vila; Joseph J. Borovian

[57] ABSTRACT

Ultraviolet light absorbers for plastics (for example polyolefins, e.g. polyethylene or polypropylene; polyvinylchloride; or a nitro lacquer), which may be incorporated with or without one or more other known ultraviolet light stabilizers into the plastics, have the formula I

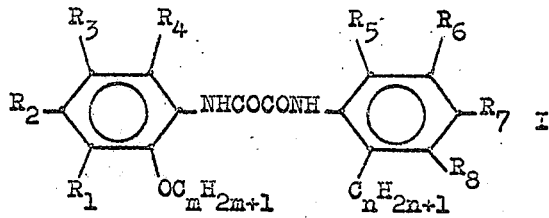

in which each of $R_1$, $R_2$, $R_3$, $R_4$, $R_5$, $R_6$, $R_7$ and $R_8$ represents H, Cl, Br, $-C_nH_{2n+1}$, $-C_nH_{2n-1}$ or $-O-C_nH_{2n+1}$ or an $-O-$aryl, aryl, aralkyl or alkaryl radical with up to eight carbon atoms, $m$ represents a whole number from 1 to 8 inclusive, and $n$ represents a whole number from 1 to 4 inclusive, with the proviso that the radicals $R_1$, $R_2$, $R_3$, $R_4$, $R_5$, $R_6$, $R_7$ and $R_8$, within their definition, may be similar or dissimilar and $n$ need not necessarily have the same value in all of the radicals where $n$ occurs, and the formula Ia

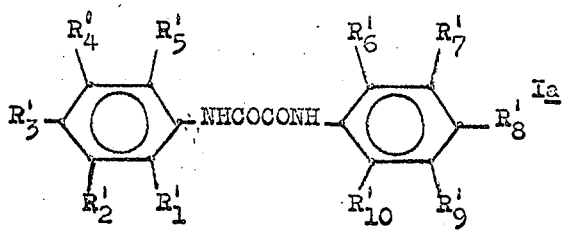

wherein each of $R_1'$ to $R_{10}'$, independently of one another, is selected from H, alkyl, aralkyl, alkaryl, alkyl—$(OC_2H_4)_n$, alkyl-$(OC_3H_6)_n$, Cl, Br, OH, O-alkyl, O-aryl, S-alkyl, S-aryl, COO-alkyl, COO-aryl, CONH-alkyl, CONH-aryl, NHCO-alkyl, NHCO-aryl, alkyl ether radicals and alkyl thioether radicals, with the proviso that at least one of the radicals $R'_1$ to $R'_{10}$ must be such that at least one $-C-S-C-$ grouping is present in the compound, and $n'$ represents a whole number of from 1 to 12 inclusive.

52 Claims, No Drawings

OXALIC ACID DERIVATIVES

This application is a continuation-in-part of our co-pending applications, Ser. No. 170,660, filed Aug. 10, 1971, now U.S. Pat. No. 3,808,273, and Ser. No. 808,041, filed Mar. 12, 1969; and now abandoned, said Ser. No. 808,041 being, itself, a continuation-in-part of application Ser. No. 799,898, filed Feb. 17, 1969, and now abandoned.

It is known that certain asymmetric diaryloxalamides may be used as UV light absorbers for plastics. The known compounds of this class, however, are either relatively difficultly soluble in the plastics, especially polyolefins, or alternatively contain one or more high molecular weight organophile radicals with a hydrocarbon portion containing more than eight carbon atoms which reduce the effectiveness of the diaryloxalamides as UV light absorbers.

It has now been found that asymmetric diaryloxalamide compounds of the formula I below have a good solubility in plastics, especially in polyolefins, which compounds do not contain any of the above mentioned high molecular weight organophile radicals in their molecule.

The present invention provides compounds of the formula I

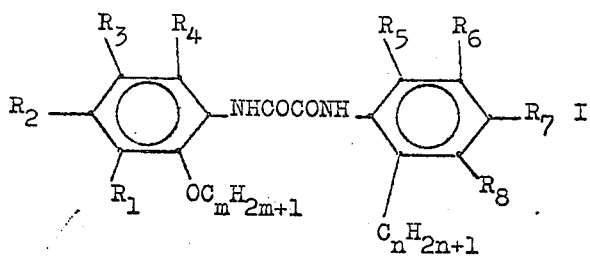

in which each of $R_1$, $R_2$, $R_3$, $R_4$, $R_5$, $R_6$, $R_7$ and $R_8$ represents H, Cl, Br, $-C_nH_{2n+1}$, $-C_nH_{2n-1}$ or $-O-C_nH_{2n+1}$ or an $-O-$aryl, alkaryl, aralkyl or aryl radical with up to eight carbon atoms, $m$ represents a whole number from 1 to 8 inclusive, and $n$ represents a whole number from 1 to 4 inclusive, with the proviso that the radicals $R_1$, $R_2$, $R_3$, $R_4$, $R_5$, $R_6$, $R_7$ and $R_8$, within their definition, may be similar or dissimilar and $n$ need not necessarily have the same value in all of the radicals where $n$ occurs.

The present invention also provides a process for the production of the compounds of formula I, which process is characterized in that 1 mol of oxalic acid or 1 mol of a functional derivative (for example an ester, acid halide or ester halide, e.g. the acid chloride, acid bromide or an ester chloride) thereof is reacted, simultaneously or consecutively, with 1 mol of a compound of the formula II

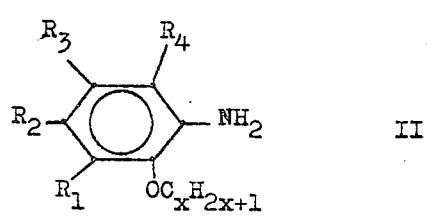

in which $R_1$ to $R_4$ are as defined above and $x$ is zero or a whole number from 1 to 8 inclusive, and 1 mol of a compound of the formula III

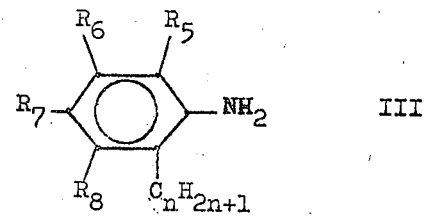

in which $R_5$ to $R_8$ and $n$ are as defined above, in such a way that amidation of the oxalic acid or its functional derivative is effected to the highest degree possible, and that the resulting product is alkylated with an alkylation agent containing the above radical $-C_mH_{2m+1}$ when said product contains a phenolic hydroxyl radical.

The compounds of formula I are very stable against the effect of heat, absorb UV light rays, and are easily soluble in plastics, especially polyolefins.

The present invention thus also provides a plastics, especially polyethylene or other polyolefin, structure containing dissolved therein a UV light stabilizer constituted by a compound of the formula I above. Preferably the amount of said compound I in said plastics structure should be from 0.1 to 0.5% by weight. Furthermore, it is also within the scope of the present invention to add to the plastics with the dissolved UV light stabilizer of the formula I one or more additional UV light stabilizers, e.g. a nickel salt UV light stabilizer, a nickel complex UV light stabilizer or a sterically hindered phenol UV light stabilizer.

By means of two concrete cases, the following Examples 1 and 2 explain how the diaryloxalamides of the formula I may be produced, the temperatures being stated in degrees Centigrade and the quantities in parts by weight. In Table 1, given after Examples 1 and 2, further compounds of formula I are listed which are produced in accordance with the method set forth in Example 1 or 2. The compounds of formula I as produced by the specifically described method may be incorporated in plastics without purification or may first be purified. Plastics containing a compound of formula I in an amount of from 0.1 to 0.5% by weight are protected against heat and especially against UV light rays; specifically pressed sheets of polyethylene containing such an amount of a compound of formula I are clear in appearance and protected against the harmful effect of UV light rays to an extent sufficient for practical purposes.

Examples A to D illustrate specific methods of using specified compounds of formula I. In Table 2 there are mentioned, for purposes of comparison, a number of diaryloxalamides and their properties which diaryloxalamides do not have the formula I and are therefore outside the scope of the present invention. In both Tables, E signifies the molar extinction coefficient. This was determined with light of a wave length lambda with an alcoholic solution of the oxalamide. Lambda is also the most strongly absorbed wave length expressed in m$\mu$.

The solubility of the oxalamides in ethyl alcohol and benzine (boiling point 100° to 120°C, $D_4^{20} = 0.727$) was determined at 20° to 22° in milligrams per litre.

In the Examples reference is made to a Xenotest apparatus and to a Fadeometer; these are manufactured by Atlas Electric Devices Company of Chicago 10, Illinois, U.S.A., the Fadeometer being sold under the designation "Typ FOA-R Serie No. FO 2770."

EXAMPLE 1

Production of o-ethoxy-o'-ethyl-oxalic acid bis-anilide hard mass results which is first comminuted and subsequently triturated with alcohol in a trituration dish, suctioned off and washed with alcohol.

The resulting crude product melts at 121° to 131°. By recrystallization from benzene pure colourless o-ethyloxy-o'-ethyl-oxalic acid bis-anilide is obtained with a melting point of 119° to 121° and a yield of about 65%.

EXAMPLE 2

By using o-aminophenol instead of o-phenetidine in

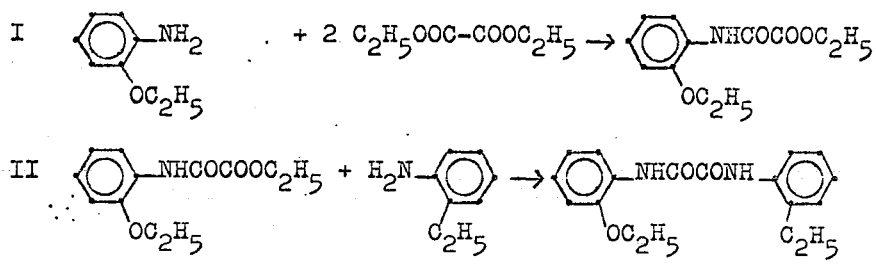

I. o-Phenetidine and oxalic acid diethyl ester are mixed in molar ratio 1:2. About 3 to 4 ml, per mol of amine, of ethereal boron trifluoride as catalyst are added to the resulting mixture and heating while stirring is effected to a bath temperature of 130°. After a short time, dissolution takes place. When ethanol reflux commences, a vacuum (about 200 mm of Hg) is applied to the mixture so as to remove the ethanol and stirring at the same temperature is continued for a further 1½ hours. The resulting dark brown solution is stirred for a further 10 minutes with decolorizing charcoal at the same temperature and filtering is then effected with the addition of a filtration auxiliary.

Distillation at reduced pressure is then effected in order to remove excess oxalic acid diethyl ester.

On cooling, the resulting ester amide crystallizes out completely; melting point 65° to 71°, yield: 85 to 90%.

By recrystallization from alcohol the colourless, pure product of melting point 76° to 77° is obtained. However, this purification is unnecessary and the crude product may be used for reaction with a further amine, e.g. as shown at section III hereof. II. The ester amide produced as at I hereof and 2-ethylaniline in molar quantities are heated for 4 hours to a bath temperature of 170° with the addition of a little ethereal boron trifluoride as catalyst. The resulting alcohol is removed at reduced pressure (200 mm of Hg) during the reaction. After the reaction is complete, the resulting dark mash is poured into a dish and allowed to cool, whereby a Example 1 there is obtained the compound of the formula

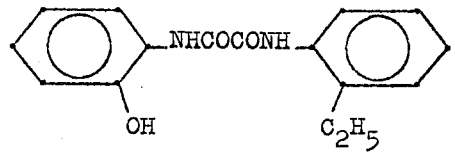

1 mol of this compound together with 25 mol of acetone, 1.5 mol of potassium carbonate and 1.2 mol of n-hexylbromide are heated for 60 hours to 55° while stirring. Subsequently the acetone is distilled off in a vacuum, the residue is washed several times with water and recrystallization from alcohol is effected. The compound of the formula

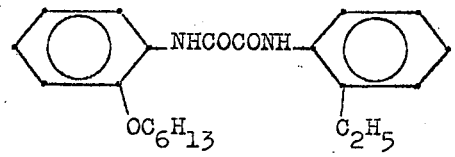

is obtained with a yield of approximately 90% in the form of white crystals of melting point 71° to 72°. The absorption maximum in alcoholic solution is around 300 to 310 mμ, the extinction coefficient amounts to 13,700. At 20° the solubility in alcohol is about 16.5 grams per litre and in benzine about 23 grams per litre.

Table 1.

| Constitution | m.p. | lambda | E | Solubility in | |
|---|---|---|---|---|---|
| | | | | ethanol | benzine |
| 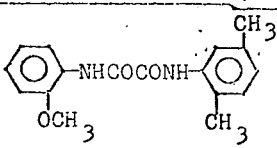 | 152-153° | 300 | 13400 | 1900 | 2100 |

Table 1 (Continued)

| Constitution | m.p. | lambda | E | Solubility in ethanol | benzine |
|---|---|---|---|---|---|
| 2-OCH₃-C₆H₄-NHCOCONH-C₆H₄-2-C₂H₅ | 143–145° | 300 | 14200 | 1700 | 1250 |
| 2-OC₂H₅-C₆H₄-NHCOCONH-C₆H₄-2-C₂H₅ | 132–135° | 300 | 14700 | 3900 | 5000 |
| 2-OC₂H₅-C₆H₄-NHCOCONH-C₆H₃-2,4-(CH₃)₂ | 133–135° | 302 | 15500 | 2400 | 2400 |
| 2-OC₂H₅-C₆H₄-NHCOCONH-C₆H₃-2,3-(CH₃)₂ | 137–138° | 302 | 15600 | 2240 | 2300 |
| 2-OC₂H₅-5-CH₃-C₆H₃-NHCOCONH-C₆H₄-2-C₂H₅ | 117–118° | 305 | 12400 | 4100 | 4500 |
| 2-OC₆H₁₃-C₆H₄-NHCOCONH-C₆H₄-2-C₂H₅ | 71–72° | 300 | 1370 | 16500 | 23000 |
| 2-O-nC₄H₉-C₆H₄-NHCOCONH-C₆H₄-2-C₂H₅ | 70–72° | 300 | 13000 | 16000 | 21000 |
| 2-OCH₃-5-C₈H₁₇-C₆H₃-NHCOCONH-C₆H₃-2,4-(CH₃)₂ | 149–151° | 305 | 12300 | 13800 | 13300 |
| 2-OCH₃-5-C₈H₁₇-C₆H₃-NHCOCONH-C₆H₄-2-C₂H₅ | 103–104° | 305 | 12100 | 7100 | 16400 |
| 2-C₂H₅-C₆H₄-NHCOCONH-C₆H₄-2-OC₄H₉(iso-) | 101–102° | 303 | 12600 | 5000 | 11000 |
| 2-OC₈H₁₇-C₆H₄-NHCOCONH-C₆H₃-2,4-(CH₃)₂ | 83–84° | 300 | 13700 | 1840 | 10000 |
| 2-OC₄H₉-C₆H₄-NHCOCONH-C₆H₃-2,4-(CH₃)₂ | 113–114° | 301 | 13000 | 330 | 5150 |

Table 1 (Continued)
| Constitution | m.p. | lambda | E | solubility in ethanol | benzine |
|---|---|---|---|---|---|
| 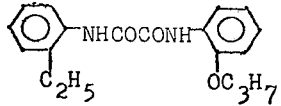 | 87-88° | 300 | 12700 | 10300 | 14300 |
| 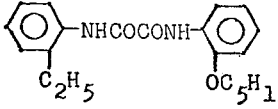 | 98-99° | 300 | 12900 | 7400 | 18100 |
| 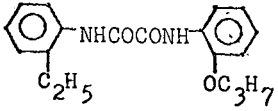 | 78-79° | 302 | 13400 | 13700 | 22900 |
| 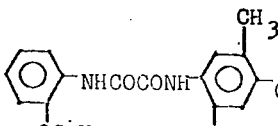 | 126-128° | 304 | 14000 | 1430 | 2500 |
| 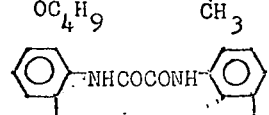 | 74-75° | 300 | 13500 | 3700 | 12700 |
| 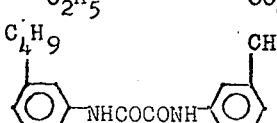 | 141-142° | 305 | 12500 | 2800 | 4700 |
| 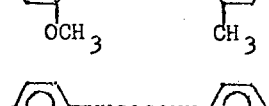 | 87-88° | 300 | 13600 | | |
| 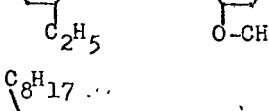 | 103-104° | 305 | 12100 | 7100 | 16400 |
| 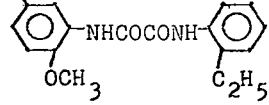 | 126-128° | 305 | 11900 | 7450 | 13000 |
| 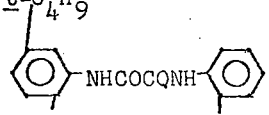 | 120-122° | 310 | 14700 | 16000 | 30500 |
| 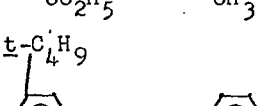 | 113-114° | 301 | 13000 | 3300 | 5200 |

Table 1 (Concluded)

| Constitution | m.p. | lambda | E | Solubility in ethanol | benzine |
|---|---|---|---|---|---|
| (phenyl)-NHCOCONH-(2,5-di-CH$_3$-phenyl), OC$_8$H$_{17}$ | 83–84° | 300 | 13700 | 1800 | 10000 |
| (phenyl)-NHCOCONH-(phenyl), O-i-C$_5$H$_{11}$, C$_2$H$_5$ | 98–99° | 300 | 12900 | 7400 | 18000 |
| (phenyl)-NHCOCONH-(phenyl), O-i-C$_3$H$_7$, C$_2$H$_5$ | 87–88° | 300 | 12700 | 10300 | 14300 |
| (phenyl)-NHCOCONH-(phenyl), O-n-C$_3$H$_7$, C$_2$H$_5$ | 78–79° | 302 | 13400 | 13700 | 23000 |
| (phenyl)-NHCOCONH-(phenyl), OC$_8$H$_{17}$, C$_2$H$_5$ | 74–75° | 300 | 13500 | 3700 | 12700 |

This following table 1a shows further compounds of formula I which can be produced according to Example 1 or 2 and which are useful as UV light stabilizers in plastics.

Table 1a

| Structure | m.p. |
|---|---|
| C$_4$H$_9$(tert.)-phenyl(OC$_8$H$_{17}$(n))-NH-CO-CO-NH-phenyl-C$_2$H$_5$ | m.p. 70–71° |
| C$_7$H$_{15}$(tert.)-phenyl(OC$_2$H$_5$)-NH-CO-CO-NH-phenyl-C$_2$H$_5$ | m.p. 75–78° |
| tert. Butyl-phenyl(OC$_2$H$_5$)-NHCOCONH-phenyl-C$_2$H$_5$ | |
| Isononyl-phenyl(OC$_2$H$_5$)-NH-CO-CO-NH-phenyl-C$_2$H$_5$ | m.p. 84–87° |
| tert. Amyl-phenyl(OC$_2$H$_5$)-NHCOCONH-phenyl-C$_2$H$_5$ | |
| tert. Butyl-phenyl(OC$_2$H$_5$)-NHCOCONH-phenyl-C$_2$H$_5$-tert. Butyl | |

Table 2

| Constitution | m.p. | lambda | E | Solubility in ethanol | benzine |
|---|---|---|---|---|---|
| H₃C-⌬(CH₃)-NHCOCONH-⌬(CH₃)-CH₃ (2,5-dimethyl on both) | 260–261° | 278 | 12500 | 82 | 84 |
| ⌬(C₂H₅)-NHCOCONH-⌬(C₂H₅) | 183–184° | 276 | 12800 | 450 | 400 |
| ⌬(OCH₃)-NHCOCONH-⌬(OCH₃) | 252–253° | 305 | 16800 | 53 | 80 |
| H₃CO-⌬-NHCOCONH-⌬-OCH₃ | 267–269° | 295 | 20000 | 4 | 4 |
| H₃C-⌬(OCH₃)-NHCOCONH-⌬(OCH₃)-CH₃ | 227–229° | 315 | 16800 | 150 | 140 |
| ⌬(OC₂H₅)-NHCOCONH-⌬(OC₂H₅) | 173–174° | 310 | 18100 | 470 | 360 |
| H₅C₂O-⌬-NHCOCONH-⌬-OC₂H₅ | 268–269° | 295 | 20900 | 4 | 24 |
| H₃C-⌬(OC₂H₅)-NHCOCONH-⌬(OC₂H₅)-CH₃ | 184–186° | 315 | 16800 | 100 | 150 |
| H₉C₄-⌬-NHCOCONH-⌬-C₄H₉ | 205–207° | 287 | 21800 | 80 | 60 |
| ⌬(OC₂H₅)-NHCOCONH-⌬-OC₂H₅ | 187–188° | 298 | 17400 | 500 | 90 |
| ⌬(OCH₃)-NHCOCONH-⌬-OC₂H₅ | 161–163° | 304 | 18600 | 675 | 105 |
| ⌬(COOCH₃)-NHCOCONH-⌬(COOCH₃) | 251–252° | 315 | 20100 | 50 | 5 |
| ⌬(OCH₃)-NHCOCONH-⌬(COOCH₃) | 188–190° | 315 | 17700 | 400 | 130 |

Table 2 (Continued)

| Constitution | m.p. | lambda | E | Solubility in ethanol | Solubility in benzine |
|---|---|---|---|---|---|
| ⟨O⟩-NHCOCONH-⟨O⟩-OCH₃ (COOCH₃) | 188–190° | 315 | 18400 | 190 | 15 |
| ⟨O⟩-NHCOCONH-⟨O⟩ (Cl, Cl) | 202–203° | 280 | 17000 | 150 | 330 |
| ⟨O⟩-NHCOCONH-⟨O⟩-Cl (Cl) | 212–213° | 280 | 19800 | 180 | 80 |
| Cl-⟨O⟩-NHCOCONH-⟨O⟩-Cl | 297–298° | 280 | 22500 | 63 | 4 |
| ⟨O⟩-NHCOCONH-⟨O⟩ (Cl, OCH₃) | 197–199° | 300 | 14300 | 500 | 400 |
| ⟨O⟩-NHCOCONH-⟨O⟩-OCH₃ (Cl) | 171–172° | 290 | 16500 | 590 | 140 |
| ⟨O⟩-NHCOCONH-⟨O⟩-OC₈H₁₇ (Cl) | 150–151° | 290 | 17400 | 320 | 500 |
| ⟨O⟩-NHCOCONH-⟨O⟩-Cl (OCH₃) | 215–216° | 290 | 17500 | 390 | 60 |
| ⟨O⟩-NHCOCONH-⟨O⟩-Cl (OC₂H₅) | 187–188° | 298 | 17400 | 500 | 90 |
| ⟨O⟩-NHCOCONH-⟨O⟩ (O-nC₄H₉, O-nC₄H₉) | 122–123° | 308 | 16700 | 650 | 1520 |

EXAMPLE A

Polyethylene is mixed in a suitable mixer at 150° with 0.2% of its weight of the compound of the formula

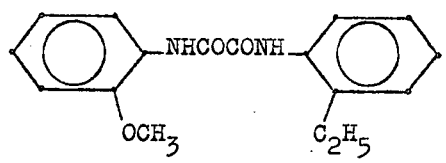

and the mixture is then pressed into sheets of a thickness of 0.25 mm.

EXAMPLE B 0.5% of the compound of the formula

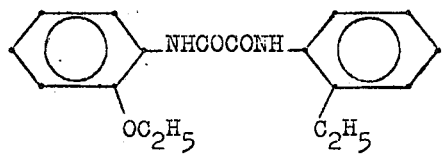

are worked into polyvinylchloride at 180°. Sheets made from the resulting mixture by pressing show no change after irradiation for 2,000 hours in the Xenotest (i.e., an apparatus provided with a xenon lamp). By measuring the UV light absorption in irradiated and unirradiated samples it can be ascertained that the concentration of the UV light absorber is still practically unchanged.

EXAMPLE C

3% by weight of the compound of the formula

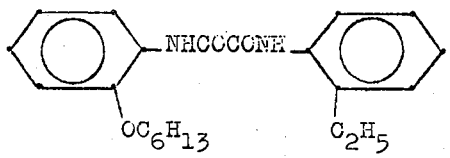

are added to a commercially available nitro lacquer. Fir wood which has been painted with this lacquer does not darken in colour on exposure to light even after a long period, whereas similarly painted pieces of fir wood with nitro lacquer not containing the above oxalamide darken in colour when similarly exposed.

EXAMPLE D

Polyethylene is mixed with 0.3% of the compound of formula

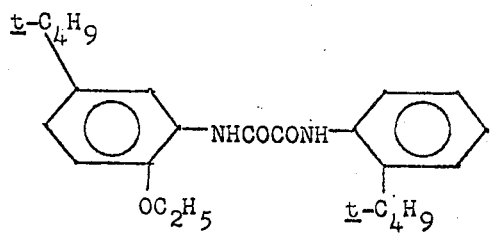

0.4% of the compound of formula

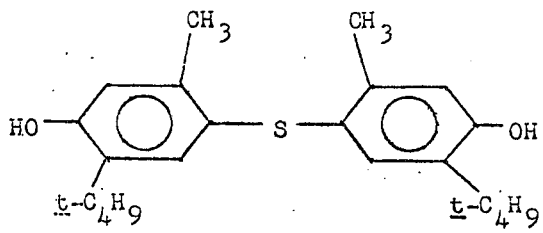

and 0.2% of tri-nonylphenyl phosphite at 180° and pressed into sheets of 0.2 mm thickness; the resulting structures are very well protected against light, heat and oxidation.

It is also known that certain diaryloxalamides may be used as UV light absorbers for plastics. The known compounds of this class have a remarkable UV light absorption power, but they do not have any special heat stabilization and antioxidation effect. We have now found that certain diaryloxalamides containing sulphur in the molecule do not only have the property of absorbing UV light rays, but also the ability to protect plastics from heat and against oxidative degradation.

The present invention provides sulphur containing diaryloxalamides of the formula Ia

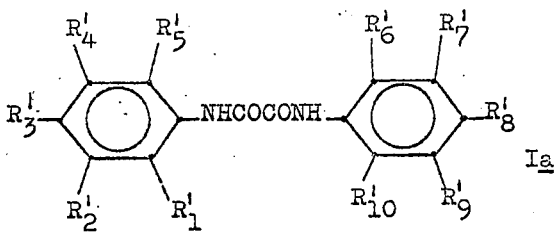

wherein each of $R_1'$ to $R_{10}'$, independently of one another, is selected from H, alkyl, aralkyl, alkaryl, alkyl-$(OC_2H_4)_{n'}$, alkyl-$(OC_3H_6)_{n'}$, Cl, Br, OH, O-alkyl, O-aryl, S-alkyl, S-aryl, COO-alkyl COO-aryl, CONH-alkyl, CONH-aryl, NHCO-alkyl, NHCO-aryl, alkyl ether radicals and alkyl thioether radicals with the proviso that at least one of the radicals $R_1'$ to $R_{10}'$ must be such that at least one —C—S—C— grouping is present in the compound, and $n'$ represents a whole number of from 1 to 12 inclusive.

Some preferred compounds of the formula Ia have the formula Ib

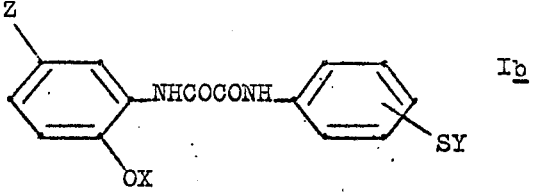

wherein X represents an alkyl radical with up to 16 carbon atoms,

Y represents an alkyl radical with up to 12 carbon atoms, and Z represents H or $CH_3$, with the proviso that —SY must be in the 2- or 4-position.

The compounds of formula Ia may be produced, in accordance with the present invention, by a process which is characterized in that 1 mol of oxalic acid or 1 mol of a functional derivative thereof (e.g. an ester, an ester halide or acid halide) is reacted with 1 mol of a compound of the formula IIa

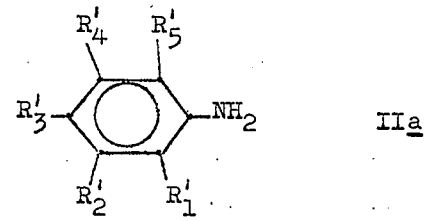

wherein $R_1'$ to $R_5'$ have the above meaning, and 1 mol of a compound of the formula IIIa

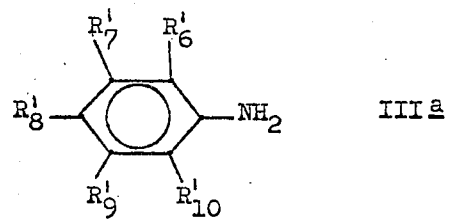

wherein $R_6'$ to $R_{10}'$ have the above meaning, in such a way that amidation of the oxalic acid or its functional derivative is effected to the greatest possible extent, and the resulting product is alkylated, when this is necessary, to give an end product of the formula Ia.

The compounds of the present invention are very stable against the effect of heat and protect plastics, especially polyoiefins, from harmful effects of UV light rays as well as heat. They can be incorporated in the plastics in the usual way, whereupon the latter can be converted into the most varied shaped articles by pressing, extruding or spinning. Especially good effects may be obtained when the compounds of the invention are incorporated into plastics in combination with a suitable co-stabilizer, for example with a sterically hindered phenol, a phosphorus containing compound, an organic tin compound, a metal (e.g. nickel) salt, a complex metal (e.g. nickel) compound which is known to be a stabilizer for plastics. Advantageously the amount of the compound of formula Ia to be added to the plastics is about 0.05 to 1%, or 0.1 to 2% of a mixture of a compound of formula Ia and a co-stabilizer, both said ranges being based on the weight of the plastics.

Examples of suitable ester halides of oxalic acid are the acid chloride or acid bromide; of the ester halides the chloride is especially suitable.

In the following Examples 1a and 2a there is described the method of producing the compounds of the formula Ia and in Examples Aa and Ba the method of their use.

PRODUCTION EXAMPLES

EXAMPLE 1a

Production of 1-ethoxy-3'-ethylthiooxalic acid bis-anilide

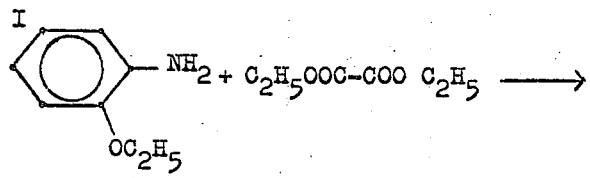

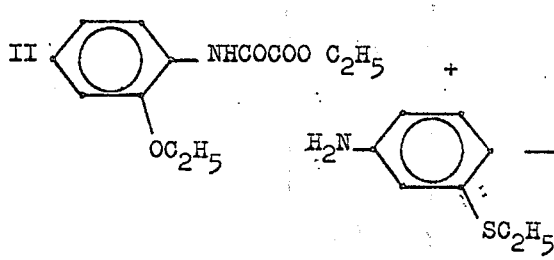

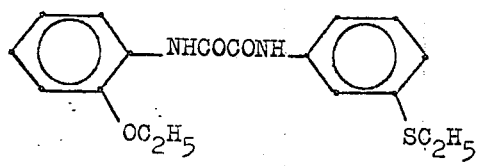

I. o-ethoxyaniline and oxalic acid diethyl ester are mixed in molar ratio of 1:2. Per mol of amine about 3 to 4 ml of ethereal boron trifluoride are added as catalyst and heating while stirring to 130°C (bath temperature) is effected. Dissolution takes place after a short while. As ethanol reflux commences the mixture is put under a vacuum (about 200 mm of Hg) in order to remove ethanol and stirring is continued for a further 1½ hours at the same temperature. The resulting dark brown solution is further stirred for 10 minutes longer with decolourizing charcoal at the same temperature and then suctioned off with the addition of a filtration aid.

Subsequently excess oxalic acid diethyl ester is distilled off at reduced pressure.

On cooling, the resulting ester amide crystallizes out completely. By recrystallization from a mixture of ethanol and water (1:1) the pure product in the form of white crystals of melting point 76°–77°C is obtained.

However, it is possible to use the crude product for the further reaction. Yield: about 90% of theory.

II. The pure ester amide produced according to I and 3-ethylthioaniline are heated in molar quantities with the addition of a little ethereal boron trifluoride for 4 hours to 170°C (bath temperature). The resulting alcohol is removed at reduced pressure (200 mm of Hg) during the reaction. After the reaction has gone to completion, the resulting dark mash is run into a dish and allowed to cool, whereby a hard mass results which is first comminuted and subsequently finely rubbed with alcohol in a trituration dish, suctioned off and washed with alcohol.

The resulting crude 1-ethoxy-3'-ethylthiooxalic acid bis-anilide can be purified by recrystallization from benzene and melts at 106°–107°C. Yield: (second step) about 90% of theory.

EXAMPLE 2a

Working is effected as at I in Example 1a, but instead of using o-ethoxyaniline o-aminophenol is used and the ester amide of the formula

is obtained. This compound is converted according to the method stated at II in Example 1a by reaction with o-methylthioaniline to give the compound of the formula

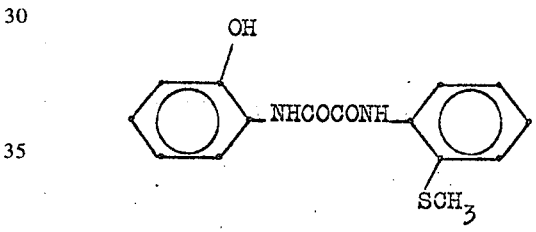

1 mol of this compound together with 20 mol acetone, 1.5 mol potassium carbonate and 1.2 mol n-octylbromide are stirred for 72 hours at 55°C. By distilling off acetone, washing the residue with water and recrystallizing from isopropanol a compound of the formula

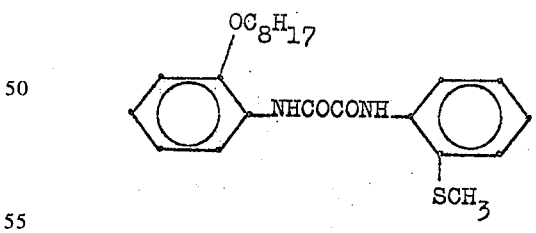

is obtained with a yield of about 85% of theory. It melts at 80°–83°C.

In similar manner it is possible to produce the compounds mentioned in the following Table 3.

In this Table the following properties of the listed compounds are stated: melting point in degrees Centigrade, wave length lambda is stated in nanometers (nm) and is the wave length of the light which is absorbed most strongly.

The molar extinction coefficient, E, was determined in an alcoholic solution.

Table 3

| Compound | m.p. in °C | lambda max. in nm | E |
|---|---|---|---|
| 1. Phenyl-NHCOCONH-phenyl, both with $SCH_3$ | 196–198 | 290 | 17000 |
| 2. Phenyl-NHCOCONH-phenyl, both with $SC_2H_5$ | 149 | 263 | 35000 |
| 3. Phenyl($C_2H_5$)-NHCOCONH-phenyl($SCH_3$) | 143–145 | 280 | 14800 |
| 4. Phenyl($OCH_3$)-NHCOCONH-phenyl($SC_2H_5$) | 125–126 | 265 | 24800 |
| 5. Phenyl($CH_3$, $OCH_3$)-NHCOCONH-phenyl($SC_2H_5$) | 113–114 | 300 | 13800 |
| 6. $(n)H_{17}C_8$-S-phenyl-NH-CO-CO-NH-phenyl($C_4H_9$(tert.), $OCH_3$) | 75–80 | | |
| 7. Phenyl($OC_2H_5$)-NHCOCONH-phenyl($SCH_3$) | 133–134 | 300 | 16200 |
| 8. Phenyl($OC_2H_5$)-NHCOCONH-phenyl-$SCH_3$ | 175–177 | 310 | 22000 |
| 9. Phenyl($OC_2H_5$)-NHCOCONH-phenyl($SC_2H_5$) | 106–107 | 300 | 15500 |
| 10. Phenyl($OC_2H_5$)-NHCOCONH-phenyl($SC_9H_{19}$) | | | |
| 11. Phenyl($CH_3$, $OC_2H_5$)-NHCOCONH-phenyl($SC_2H_5$) | 92 | 310 | 14400 |
| 12. Phenyl($OC_4H_9$)-NHCOCONH-phenyl($SCH_3$) | 93–95 | 305 | 15200 |

Table 3 (continued)

| Compound | m.p. in °C | lambda max in nm | E |
|---|---|---|---|
| 13 (2-OC$_8$H$_{17}$)C$_6$H$_4$-NHCOCONH-C$_6$H$_4$(2-SCH$_3$) | 80–83 | 300 | 15400 |
| 14 (2-OC$_4$H$_9$)C$_6$H$_4$-NHCOCONH-C$_6$H$_4$(2-SC$_2$H$_5$) | 138–140 | 300 | 15500 |
| 15 (3-OCH$_3$)C$_6$H$_4$-NHCOCONH-C$_6$H$_4$-SC$_8$H$_{17}$ | 98–100 | 308 | 21200 |
| 16 (3-OCH$_3$)C$_6$H$_4$-NHCOCONH-C$_6$H$_4$-SC$_{12}$H$_{25}$ | 104–106 | 307 | 21300 |
| 17 (2-Cl)C$_6$H$_4$-NHCOCONH-C$_6$H$_4$-SC$_{12}$H$_{25}$ | 125–130 | 285 | 12000 |
| 18 C$_{12}$H$_{25}$S-(3-Cl)C$_6$H$_3$-NHCOCONH-C$_6$H$_3$(3-Cl)-SC$_{12}$H$_{25}$ | 34–36 | 300 | 7200 |
| 19 C$_8$H$_{17}$-S-C$_2$H$_4$OOC-C$_6$H$_4$-NHCOCONH-C$_6$H$_4$-COOC$_2$H$_4$-S-C$_8$H$_{17}$ | liquid | 302 | 22000 |
| 20 C$_8$H$_{17}$-S-CH$_2$CONH-C$_6$H$_4$-NHCOCONH-C$_6$H$_4$-CONHCH$_2$-S-C$_8$H$_{17}$ | liquid | 290 | 25000 |
| 21 (2-SCH$_3$)C$_6$H$_4$-NHCOCONH-C$_6$H$_4$(2-OC$_3$H$_7$(-iso)) | 126–127 | 295 | 15500 |
| 22 (2-SCH$_3$)C$_6$H$_4$-NHCOCONH-C$_6$H$_4$(2-OC$_4$H$_9$(-iso)) | 112–113 | 298 | 15200 |
| 23 (2-SCH$_3$)C$_6$H$_4$-NHCOCONH-C$_6$H$_4$(2-OC$_5$H$_{11}$(-iso)) | 97–98 | 300 | 15500 |
| 24 (2-SCH$_3$)C$_6$H$_4$-NHCOCONH-C$_6$H$_4$(2-OC$_{16}$H$_{33}$) | 87–88 | 295 | 14000 |
| 25 (2-OC$_2$H$_5$)C$_6$H$_4$-NHCOCONH-C$_6$H$_4$-SC$_{12}$H$_{25}$ | 80–81 | 310 | 21300 |
| 26 (2-OC$_2$H$_5$)C$_6$H$_4$-NHCOCONH-C$_6$H$_4$(2-SC$_4$H$_9$) | 88–89 | 300 | 15200 |
| 27 C$_{12}$H$_{25}$S-C$_6$H$_4$-NHCOCONH-C$_6$H$_4$-SC$_{12}$H$_{25}$ | 95–98 | 300 | 12000 |

EXAMPLES OF USE

EXAMPLE Aa

In a suitable mixer there is added to polyethylene 0.3% of its weight of a compound of the formula

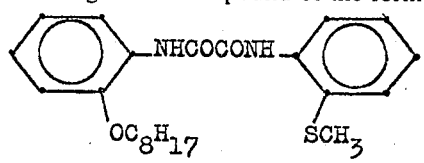

After the mixture has been homogenized, it is pressed to form sheets. The resulting sheets are stable against UV light rays and against heat.

EXAMPLE Ba

Polypropylene is mixed at 180° with 0.5% of a compound of the formula

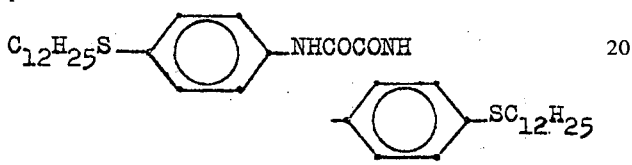

and subsequently pressed into sheets. These have a high light and heat stability. By simultaneously adding sterically hindered phenols, for example 2,6-di-tert.butyl-4-methylphenol, or of organic phosphorus compounds, for example diphenyl-isooctyl phosphite, the stability to heat is increased.

Although the present invention is described herein with particular reference to specific details, it is not intended that such details shall be regarded as limitations upon the scope of the invention except insofar as included in the accompanying claims.

What is claimed is:

1. A compound of the formula

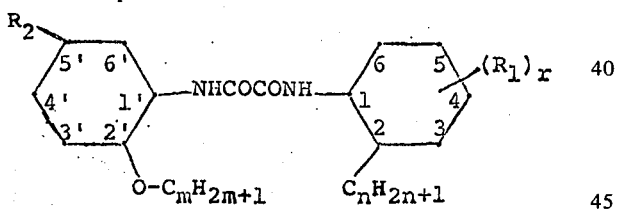

wherein $m$ represents a whole number from 1 to 8 inclusive, $n$ represents a whole number from 1 to 4 inclusive, $r$ represents the number 1 or 2, $R_1$ represents a hydrogen atom or an alkyl radical containing from one to four carbon atoms in at least one of the positions 4 or 5 of the ring, and $R_2$ represents a hydrogen atom or an alkyl radical containing from one to eight carbon atoms.

2. A compound according to claim 1 of the formula

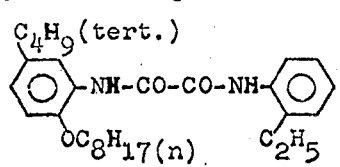

3. A compound according to claim 1 of the formula

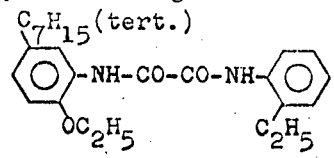

4. A compound according to claim 1 of the formula

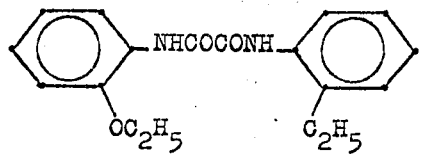

5. A compound according to claim 1 of the formula

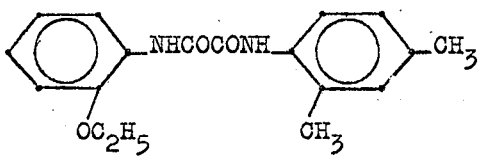

6. A compound according to claim 1 of the formula

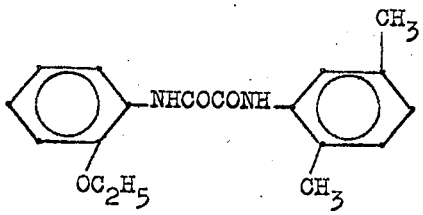

7. A compound according to claim 1 of the formula

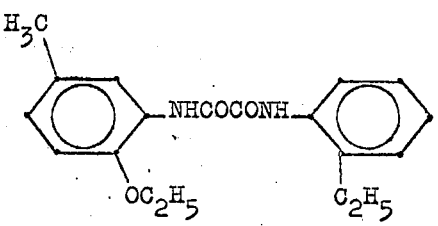

8. A compound according to claim 1 of the formula

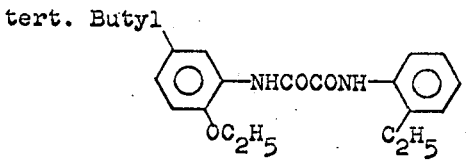

9. A compound of the formula

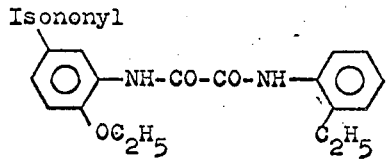

10. A compound according to claim 1 of the formula

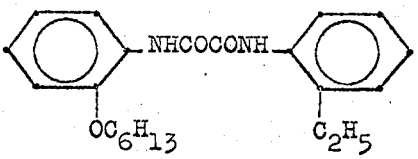

11. A compound according to claim 1 of the formula
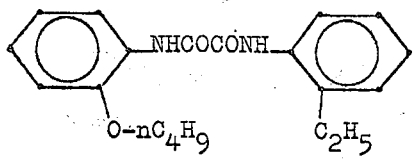

12. A compound according to claim 1 of the formula
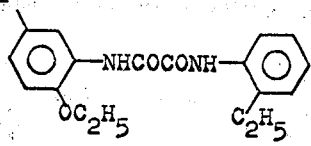

13. A compound according to claim 1 of the formula
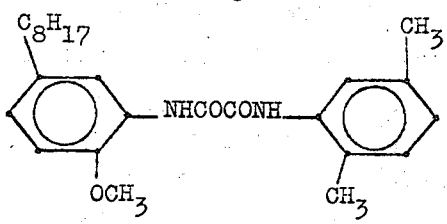

14. A compound according to claim 1 of the formula
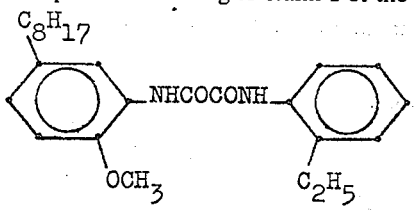

15. A compound according to claim 1 of the formula
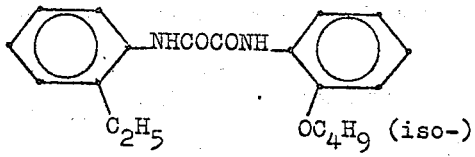

16. A compound according to claim 1 of the formula
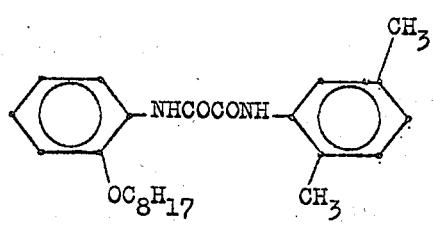

17. A compound according to claim 1 of the formula
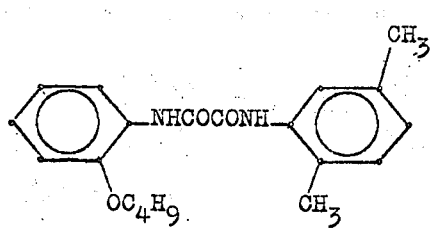

18. A compound according to claim 1 of the formula
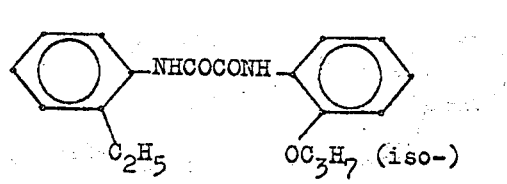

19. A compound according to claim 1 of the formula
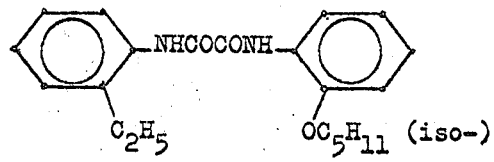

20. A compound according to claim 1 of the formula
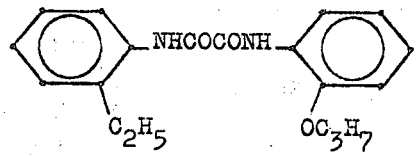

21. A compound according to claim 1 of the formula
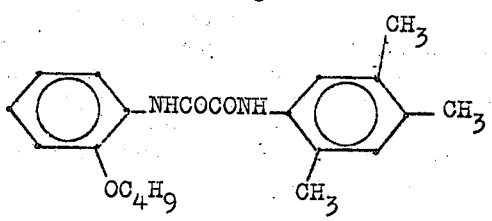

22. A compound according to claim 1 of the formula
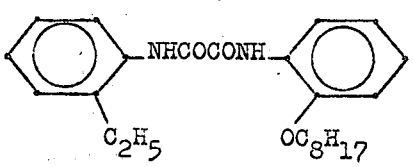

23. A compound according to claim 1 of the formula
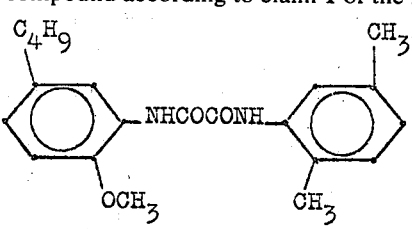

24. A compound according to claim 1 of the formula
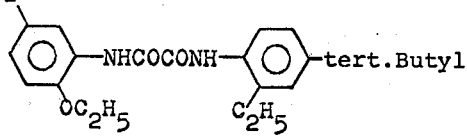

25. A compound according to claim 1 of the formula
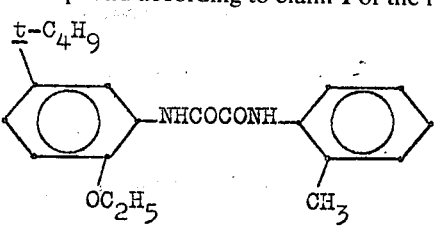

26. A compound according to claim 1 of the formula
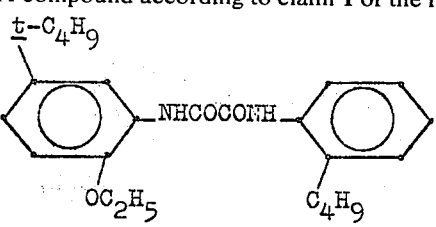

27. A compound according to claim 1 of the formula

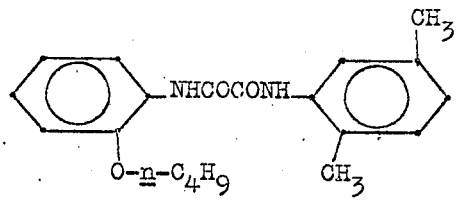

28. A compound of the formula

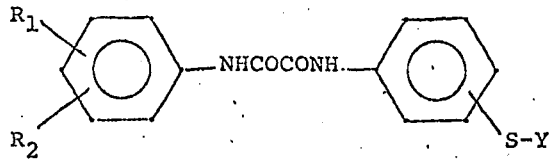

wherein $R_1$ represents a hydrogen atom or an alkyl, alkoxy or alkylmercapto group containing up to 16 carbon atoms, $R_2$ represents a hydrogen atom or a alkyl group containing up to four carbon atoms, and Y represents an alkyl group containing up to 12 carbon atoms.

29. A sulphur containing diaryloxalamide according to claim 28 of the formula Ib

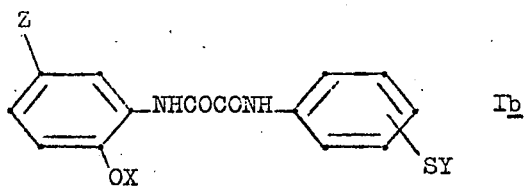

wherein X represents an alkyl radical containing up to 16 carbon atoms,
Y represents an alkyl radical containing up to 12 carbon atoms,
and Z represents H or methyl
with the proviso that the —SY group must be in the 2- or 4-position.

30. A compound according to claim 28 of the formula

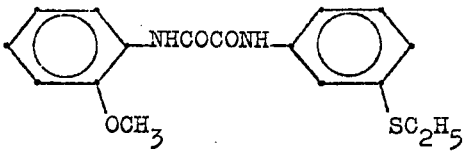

31. A compound according to claim 28 of the formula

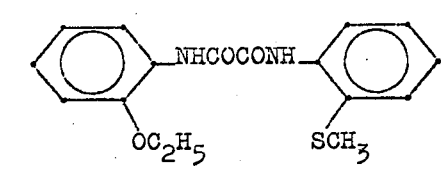

32. A compound according to claim 28 of the formula

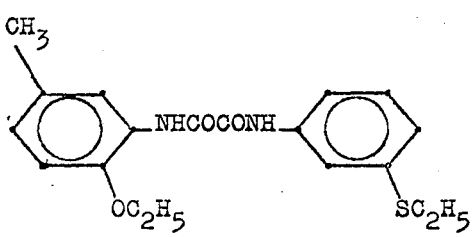

33. A compound according to claim 28 of the formula

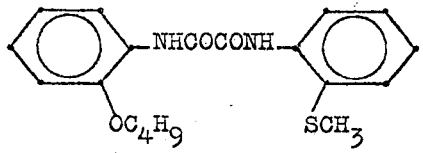

34. A compound according to claim 28 of the formula

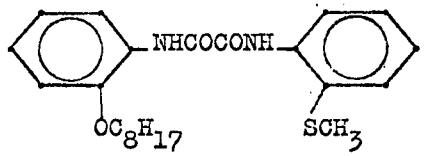

35. A compound according to claim 28 of the formula

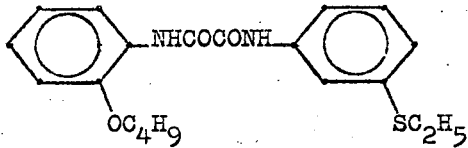

36. A compound according to claim 28 of the formula

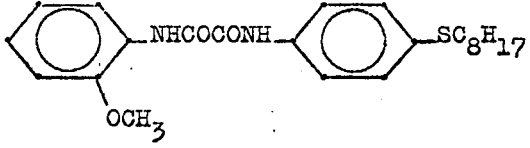

37. A compound according to claim 28 of the formula

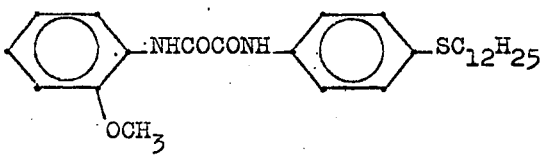

38. A compound according to claim 28 of the formula

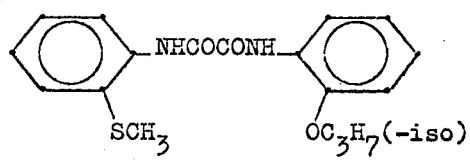

39. A compound according to claim 28 of the formula

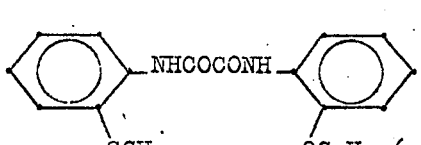

40. A compound according to claim 28 of the formula

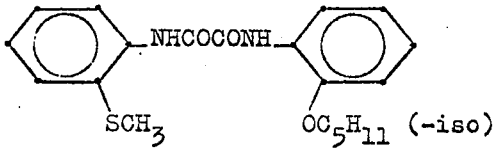

41. A compound according to claim 28 of the formula

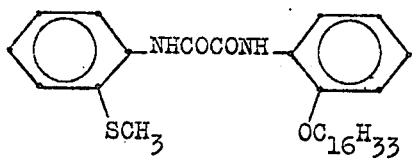

42. A compound according to claim 28 of the formula

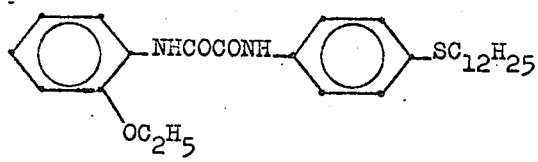

43. A compound according to claim 28 of the formula

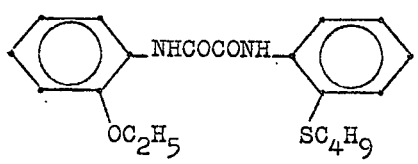

44. A compound according to claim 28 of the formula

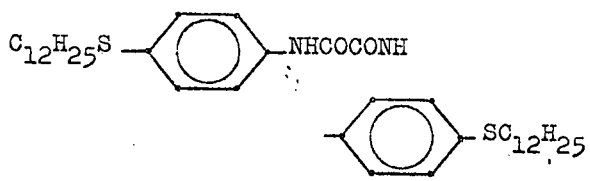

45. A compound according to claim 28 of the formula

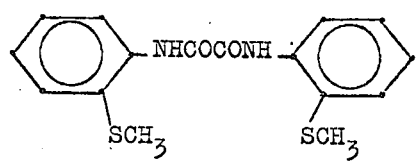

46. A compound according to claim 28 of the formula

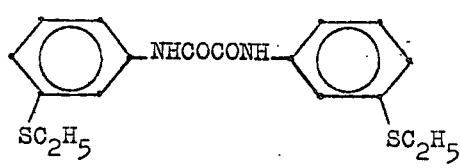

47. A compound according to claim 28 of the formula

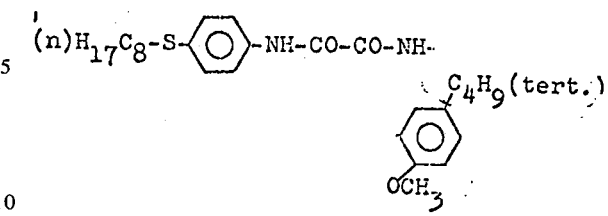

48. A compound according to claim 28 of the formula

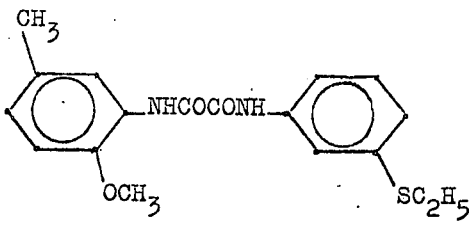

49. A compound according to claim 28 of the formula

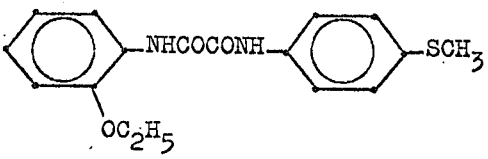

50. A compound according to claim 28 of the formula

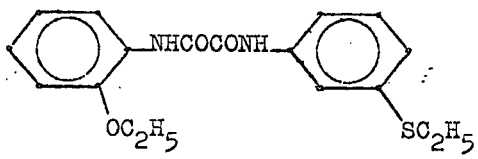

51. A compound of the formula

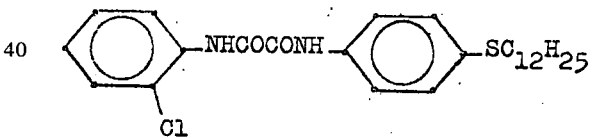

52. A compound of the formula

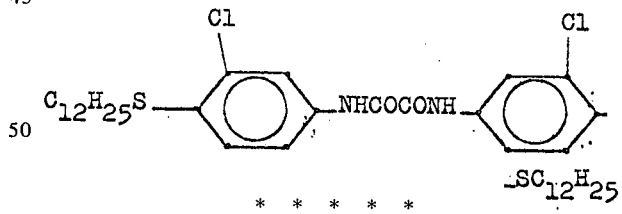

* * * * *